(No Model.)  2 Sheets—Sheet 1.
A. W. GUMP.
BICYCLE STAND.
No. 350,243.  Patented Oct. 5, 1886.
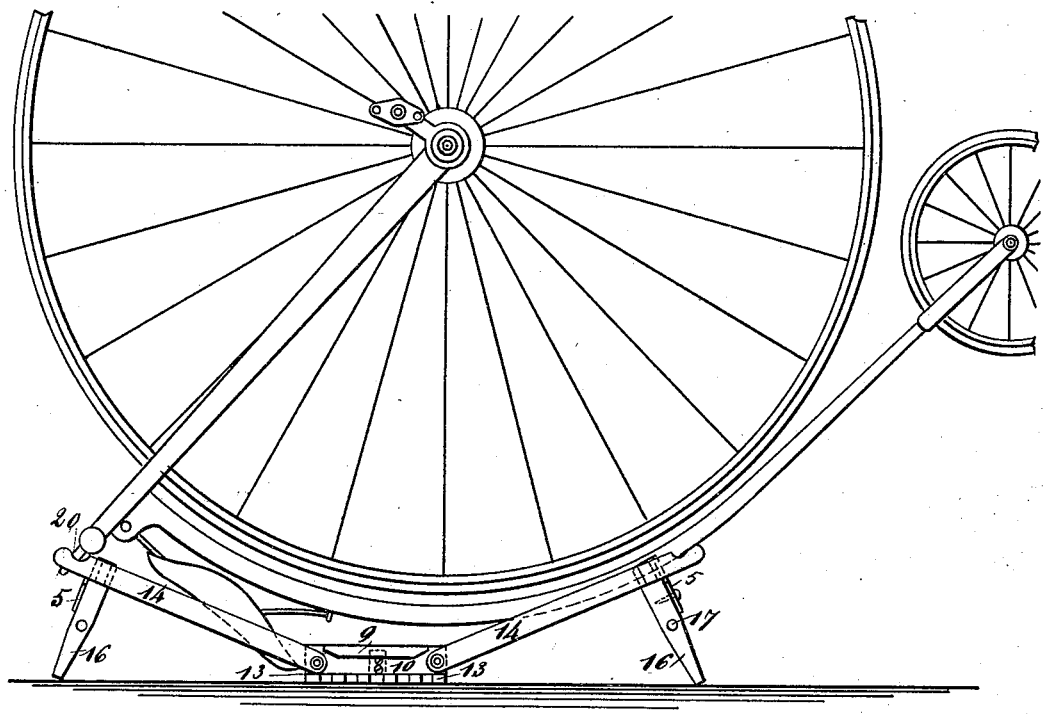
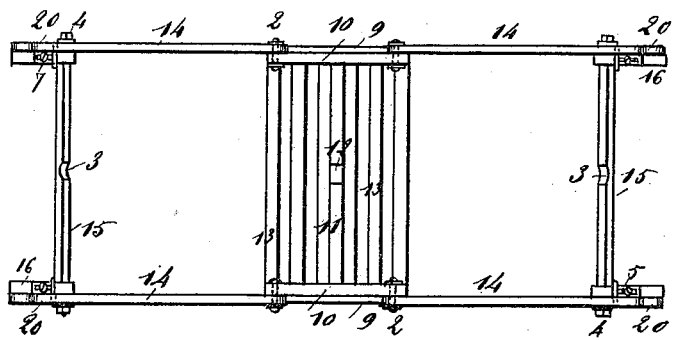
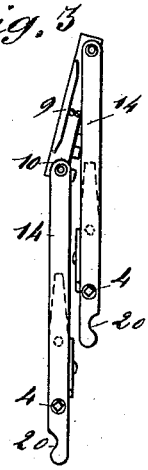
WITNESSES:
C. Neveux
C. Sedgwick
INVENTOR:
A. W. Gump
BY Munn & Co
ATTORNEYS.

(No Model.) 2 Sheets—Sheet 2.
A. W. GUMP.
BICYCLE STAND.
No. 350,243. Patented Oct. 5, 1886.
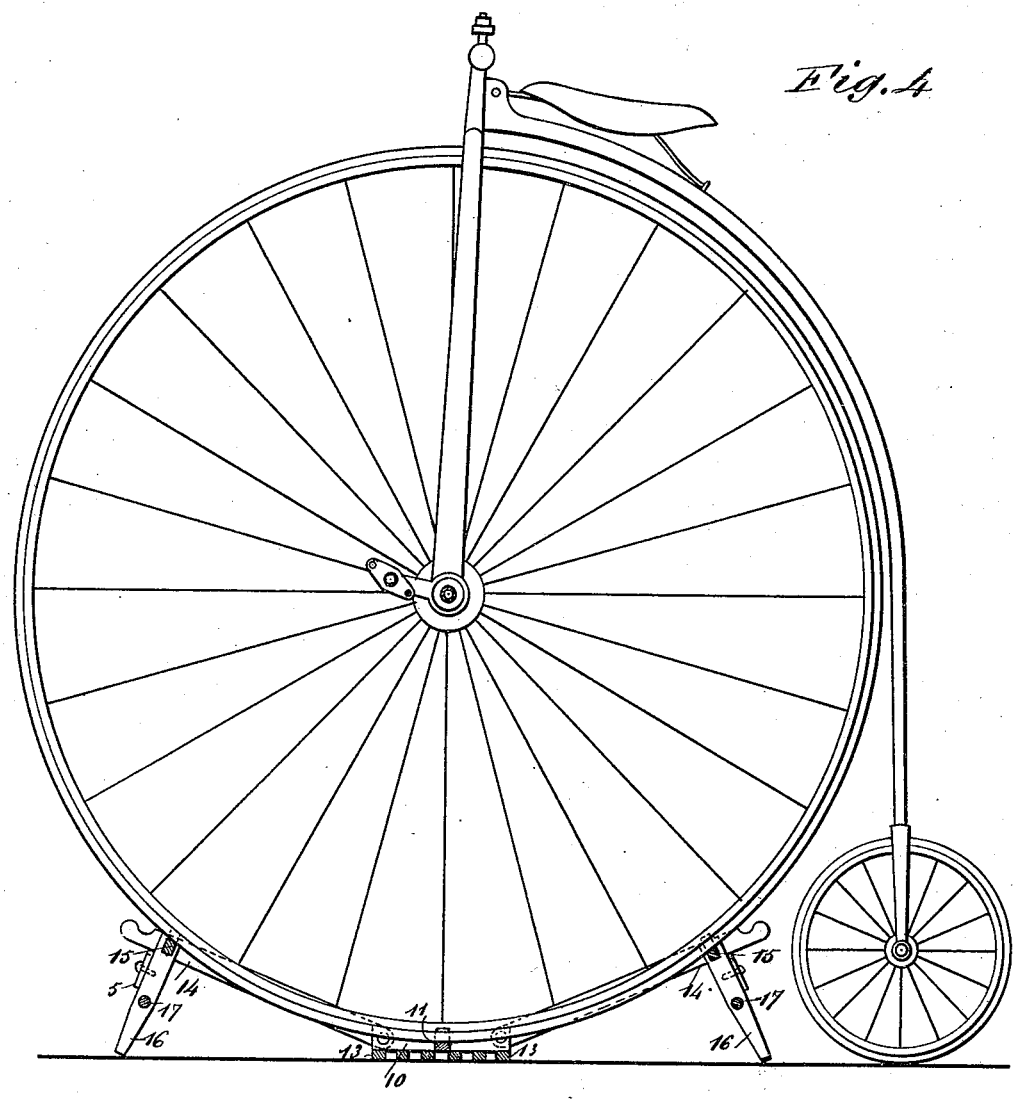
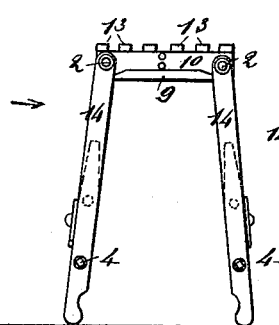
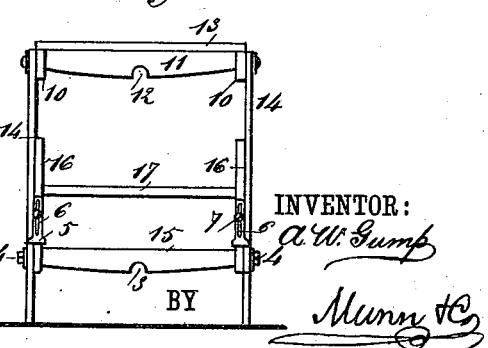
WITNESSES:
C. Neveux
C. Sedgwick
INVENTOR:
A. W. Gump
BY
Munn & Co.
ATTORNEYS.

United States Patent Office.

ALBERT W. GUMP, OF DAYTON, OHIO.

BICYCLE-STAND.

SPECIFICATION forming part of Letters Patent No. 350,243, dated October 5, 1886.

Application filed April 12, 1886. Serial No. 198,576. (No model.)

*To all whom it may concern:*

Be it known, that I, ALBERT W. GUMP, of Dayton, in the county of Montgomery and State of Ohio, have invented a new and Improved Bicycle-Stand, of which the following is a full, clear, and exact description.

This invention relates to the construction of an adjustable bicycle-stand, which may be adjusted to hold the bicycle in either an upright or an inverted position, and which can be adjusted so as to be used as a camp-stool, or which may be folded to a flat position so that it will take up very little room.

Reference is to be had to the accompanying drawings, forming a part of this specification, in which similar figures of reference indicate corresponding parts in all the figures.

Figure 1 represents my improved bicycle-stand as it appears when adjusted to support a bicycle in an inverted position. Fig. 2 is a plan view of the stand with the bicycle removed, the stand being, however, represented in position to receive the bicycle. Fig. 3 is a view of the stand as it appears when folded and ready for transportation. Fig. 4 is a central sectional view of the stand as it appears in its extended position, a bicycle being shown in connection therewith. Fig. 5 is a view of the stand as it appears when adjusted for use as a camp-stool; and Fig. 6 is a similar view, looking in the direction of the arrow shown in Fig. 5.

The stand illustrated in the drawings above referred to consists, essentially, of two main supporting-strips, 10 10, between which there is arranged a heavy cross-bar, 11, formed with a central notch or aperture, 12, slats 13 being fixed to one face of the side strips, 10, as best shown in Fig. 5. To either end of each of the strips 10 I pivotally connect legs 14, connection being made by means of the bolts or rivets 2, that are provided with proper interposed washers. The lower or extending ends of the two sets or pairs of legs 14 are united by cross-bars 15, formed with central notches, 3, connection between the legs 14 and the cross-bars 15 being established by means of tap-bolts 4, which pass through enlarged apertures formed in the legs 14 and engage directly with the cross-bars 15; but before reaching the said cross-bars 15 the bolts 4 pass through apertures formed in short folding legs or braces 16, the lower ends of which are united by cross-bars 17, as best shown in Fig. 6. The legs 16 are each provided with adjustable stops 5, that are formed with elongated slots 6, and held to the legs 16 by set-screws 7. Each of the main bars 10 is provided with a cross-strip, 9, which extends from either side of the center of the strips 10 to a position so that when the legs 14 are moved to the position shown in Fig. 5 their inner faces will abut against the ends of the strips 9.

From the construction described it will be seen that the stand being placed, as indicated in Fig. 1, so that the strips 13 rest upon the floor or ground, the legs 14 may be extended to the position in which they are represented in Figs. 1, 2, and 4; in which position they are supported by the short legs or braces 16, which may be folded outward so that their lower ends rest upon the ground; and it will be seen that the angle at which the legs 14 are supported depends upon the position of the slides 5, for if the slides are moved outward between the ends of the legs 16 the said legs 16 will be folded to a line more nearly parallel with that occupied by the legs 14, and consequently the outer ends of the said legs 14 would be lower—that is, closer to the ground or floor. Now, when the stand is in the position described, and it is desired to support the bicycle in its upright position, the driving-wheel is placed so that it enters the recesses 12 and 3, the legs 14 being adjusted so that the three recesses will be in a circular line of which the axis of the driving-wheel is the center. If, on the other hand, it is desired to support the bicycle in an inverted position, the backbone of the machine is fitted within one of the recesses 3 and the handle of the machine depressed, so that it will rest within recesses 20, formed on the inner faces of the legs 14, below the point where the cross-strips 15 are secured, no change in the stand being at this time required, a bicycle supported as just described being shown in Fig. 1.

When not in use as a bicycle-stand, the legs 14 may be moved to the position in which they are shown in Figs. 5 and 6, thus converting the stand into a stool, and when it is desired to ship or transport the stand from place to place it may be adjusted so as to occupy the position shown in Fig. 3.

Having thus fully described my invention, what I claim as new, and desire to secure by Letters Patent, is—

1. A bicycle-stand consisting of main supporting-strips carrying a recessed cross-bar, outwardly-extending legs that are pivotally connected to the main supporting-strips, and braces or legs arranged to support the outer ends of the main legs, substantially as described.

2. In a bicycle-stand, the combination, with the main body of the stand, of pivotally-connected legs, the ends of which carry recessed cross-strips 15, and short supporting braces or legs carried by tap-bolts by which the strips 15 are supported, substantially as described.

3. In a bicycle-stand, the combination, with the main body of the stand, that is provided with strips 9, of pivotally-connected legs 14, short braces or legs 16, pivotally connected to the extending legs 14, adjustable stops 5, carried by the legs 16, and recessed strips, as 15 and 11, substantially as described.

4. The combination, with the main body of a bicycle-stand, of pivotally-connected legs formed with recesses 20, short braces or legs pivotally connected to the extending ends of the main legs, and a recessed cross-strip, as 15, substantially as described.

5. As a new article of manufacture, a bicycle-stand embodying the following elements: main side strips, 10, cross-strips 11, recessed at 12, strips 9, carried by the strips 10, legs 14, pivotally connected to the ends of the strips 10, slats 13, carried by the strips 10, short folding legs 16, pivotally connected to the extending ends of the legs 14 and provided with stops 5, and strips 15, formed with recesses 3, said strips being carried by tap-bolts which pass through the legs 14 and serve as pivotal supports for the legs 16, substantially as described.

ALBERT W. GUMP.

Witnesses:
ALA. McCLURE,
A. N. BINKERD.